United States Patent [19]

Gilkey

[11] Patent Number: 5,133,832

[45] Date of Patent: Jul. 28, 1992

[54] PROCESS AND SYSTEM FOR PREPARATION OF WASTE PAPER STOCK WITH SHORT AND LONG FIBER FRACTIONATION

[75] Inventor: Mark W. Gilkey, Oxford, Ohio

[73] Assignee: The Black Clawson Company, Middletown, Ohio

[21] Appl. No.: 726,862

[22] Filed: Jul. 8, 1991

[51] Int. Cl.$^5$ ............................................. D21C 5/02
[52] U.S. Cl. ........................................ 162/4; 162/55; 162/6; 209/17
[58] Field of Search .................... 162/4, 5, 55, 6; 209/17

[56] References Cited

U.S. PATENT DOCUMENTS

| | | | |
|---|---|---|---|
| 3,016,323 | 1/1962 | Altmann et al. | 162/4 |
| 3,909,400 | 8/1975 | Seifert | 209/240 |
| 3,925,150 | 12/1975 | Marsh | 162/4 |
| 4,332,638 | 6/1982 | Mauer et al. | 162/55 |
| 4,501,040 | 10/1985 | Biondetti et al. | 162/60 |
| 4,501,662 | 2/1985 | Biondetti | 162/55 |
| 4,686,005 | 7/1987 | Biondetti et al. | 162/60 |
| 4,722,793 | 2/1988 | Seifert et al. | 162/55 |
| 4,780,179 | 10/1988 | Clement | 102/55 |
| 4,915,821 | 4/1990 | Lamort | 162/55 |

FOREIGN PATENT DOCUMENTS 162179 11/1985 European Pat. Off. ............... 162/4

OTHER PUBLICATIONS

"Advanced Technology for Secondary Fibre Treatment in Tissue Systems" 1983, E. Linck & H. Holik.
"Fractionation Prior to Floatation-A New Approach for Deinking Technology" Tappi 1990.

Primary Examiner—Karen M. Hastings
Attorney, Agent, or Firm—Biebel & French

[57] ABSTRACT

In apparatus and methods for preparing deinked paper making stock, the initially pulped and cleaned stock is fractionated by filtering through a continuously moving mesh belt of a predetermined mesh size which will retain substantially all of the fibers of greater than a predetermined length as a first suspension fraction and a second suspension fraction comprising the majority of the liquid component of the feed suspension along with small contaminant particles and the remaining fines. These two fractions are then treated separately by bleaching the first fraction and recovering the fines from the second fraction, after which the fines and the first fraction are recombined for further treatment and use.

4 Claims, 2 Drawing Sheets

PROCESS AND SYSTEM FOR PREPARATION OF WASTE PAPER STOCK WITH SHORT AND LONG FIBER FRACTIONATION

BACKGROUND OF THE INVENTION

There is currently a high degree of activity throughout the pulp and paper industry in the recycling of paper products, and it is therefore important that this industry be provided with the most efficient systems and methods for deinking and otherwise cleaning and preparing waste paper for reuse.

It has been proposed as one approach to this objective that prior to treatment of waste paper stock to remove dispersed ink and other small contaminant particles therefrom, which is commonly done by froth flotation, the stock be fractionated into a long fiber fraction and a fines fraction which also includes the ink and other small particles. The two fractions can then be treated separately in subsequent cleaning and bleaching operations before being recombined for final preparation and reuse in the making of paper. A practical problem in utilizing this procedure has been difficulty in minimizing the extent to which long fibers remain in the fines fraction, because they tend both to interfere with removal of the small contaminant particles and also to be removed with those particles.

SUMMARY OF THE INVENTION

The present invention is directed broadly to this technology, and specifically to the provision of systems and methods for carrying out such fractionation-preparation of waste paper stock more effectively and efficiently than by any approach to this objective proposed by the prior art, and especially which will minimize the proportion of long fibers retained in the fines fraction.

The present invention provides systems and methods for use in the preparation of waste paper stock wherein after the stock has been screened to remove large and heavy contaminant particles, the stock is fractionated into a first fraction composed predominantly of long fibers, e.g. greater than 0.20 mm in length, which is of relatively high consistency, and a second fraction of much lower consistency comprising the great majority of the contaminant particles, such particularly as dispersed particles of ink, and a substantial proportion of short fibers but minimal quantities of long fibers.

The long fiber fraction can then be effectively and efficiently bleached by an agent such as hydrogen peroxide ($H_2 O_2$), preferably after further dewatering because this bleaching treatment is most efficiently carried out on relatively high consistency stock. The other fraction, which is relatively free of long fibers, is treated separately, preferably first by flotation to separate the ink particles and other small and light contaminants from the fibers, after which the short fiber fraction can be bleached and then recombined with the long fiber fraction for final preparation for reuse.

The primary key to the success of the present invention lies in carrying out the fractionation by means of a continuously moving mesh belt of a predetermined mesh size which will retain the maximum qunatity of the desired long fibers while providing for passage therethrough of small contaminant particles along with the majority of the liquid component of the feed stock, as well as substantial quantities of the short fibers, referred to as "fines" hereinafter. More specifically, the invention can be practiced by carrying out the fractionation on apparatus for thickening pulp and paper stock in accordance with Seifert et al U.S. Pat. No. 4,722,793 issued to the assignee of the present invention.

When apparatus of this type is employed for the practice of the invention, utilizing a woven mesh belt of the appropriate predetermined mesh size which will pass only fibers and other particles having a maximum dimension of approximately 0.20 mm, the desired fractionation can be effected very efficiently in terms of capacity as measured in units such as tons of fiber per day. Also, the fractionation has been found to be more effective than with apparatus of other types conventionally used for this purpose, such particularly as pressure screens wherein the screening element is a metal cylinder having perforations therethrough which determine the size of the retained and accepted fibers and other particles in the feed stock, e.g. screens of the characteristics disclosed in co-owned Seifert U.S. Pat. No. 3,909,400 of 1975.

More specifically, such use of a continuously moving mesh belt for fractionation has been found to provide a high degree of retention of the long fibers while passing optimum percentages of ink particles, ash and clay with the white water. Also, a substantial portion of the fines will be retained with the long fibers, and this promotes maximum recovery of those fines that do pass through the belt with the white water because they are less likely to become entrained in the bubbles which collect the ink and other contaminant particles in froth flotation treatment. As a result, the separated fractions can be treated individually more efficiently than with fractions obtained by other means, so that the invention contributes overall substantial savings to the producer of recycled paper pulp.

Other features and advantages of the invention will be apparent from or pointed out in the course of the description of the preferred embodiments thereof which follows.

DESCRIPTION OF THE PREFERRED EMBODIMENTS

Figure 1:
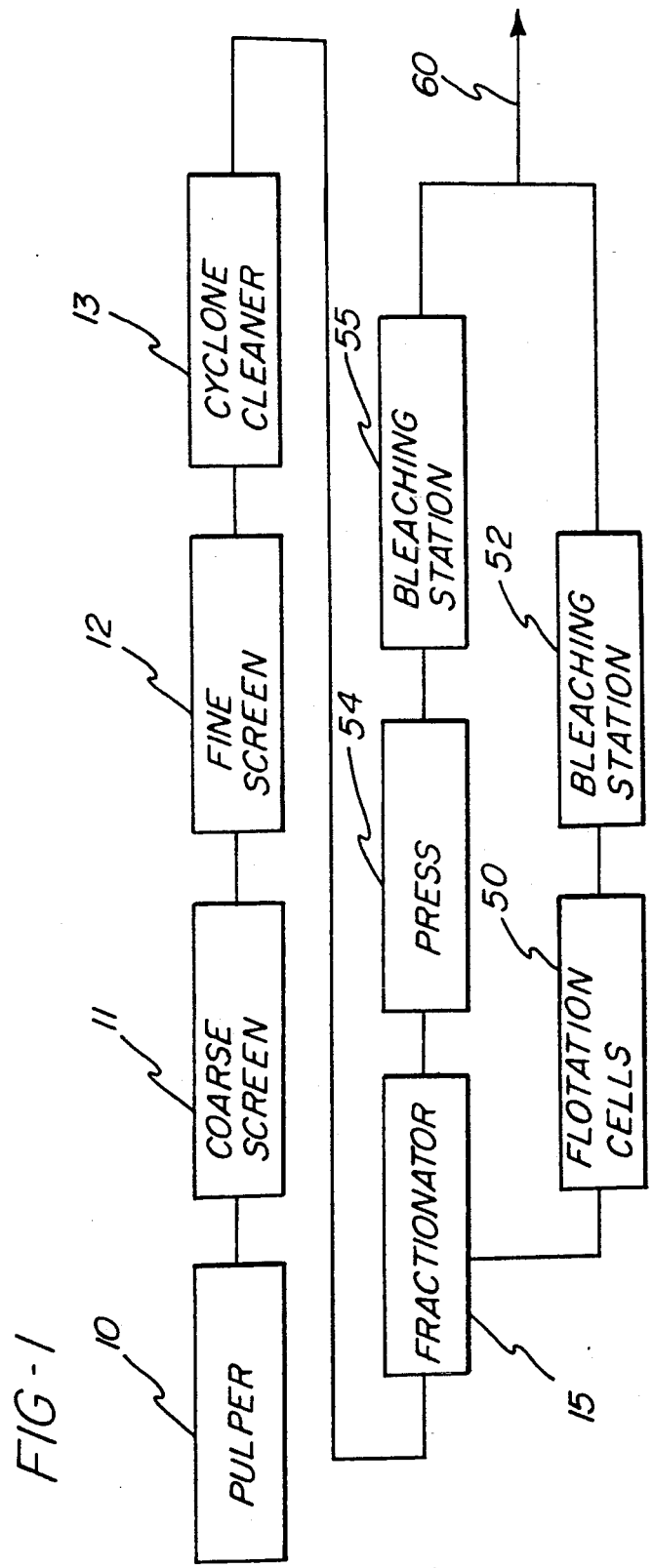
FIG. 1 is a schematic view illustrating a system in accordance with the invention for carrying out the method of the invention.

In the system illustrated in FIG. 1, the preliminary stages are conventional and are accordingly illustrated diagrammatically as a pulper 10, relatively coarse and fine screens 11 and 12 for removing large contaminant particles, and a cyclone cleaner 13 for removing "stickies" and other light contaminant particles. In a preferred embodiment of the invention, the screens 11 and 12 may be of the pressure type disclosed in co-owned Seifert U.S. Pat. Nos. 4,105,543 and 3,849,302 respectively, with the screening member in screen 11 having circular screening perforations 0.05 inch in diameter while the screening member in screen 12 has slots 0.008 inch in width, and the cleaner 13 is constructed in accordance with the co-owned Bliss U.S. Pat. No. 4,564,443.

Figure 2:
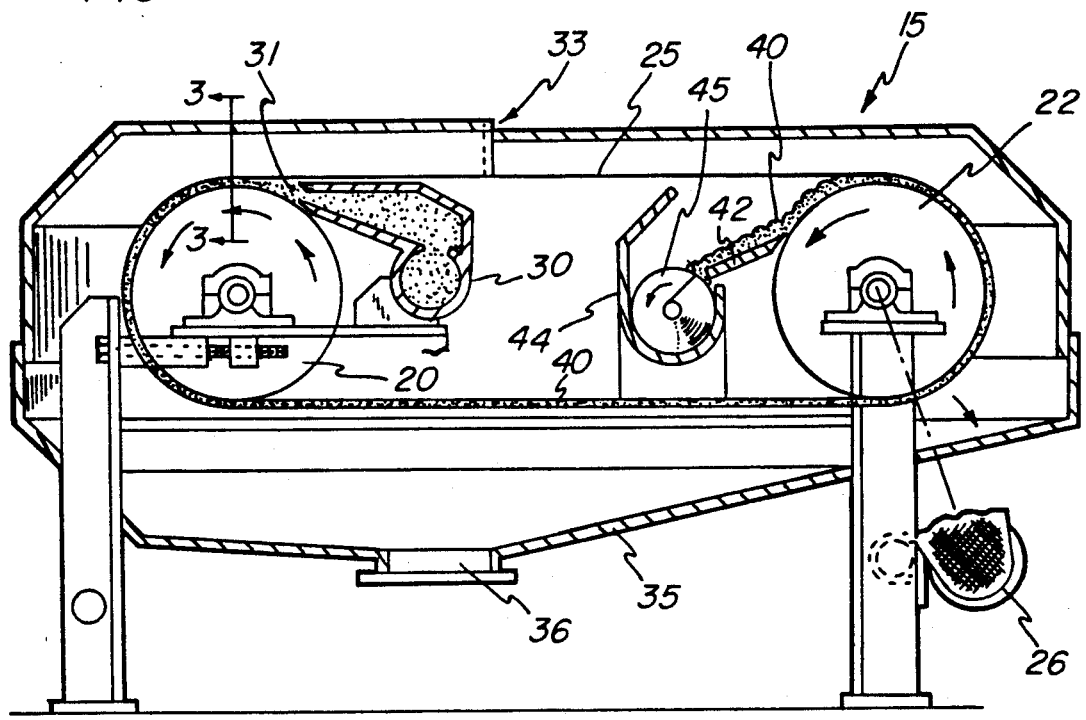
FIG. 2 is a somewhat diagrammatic view in side elevation of the preferred apparatus for carrying out the fractionation step in the method of the invention.
Figure 3:
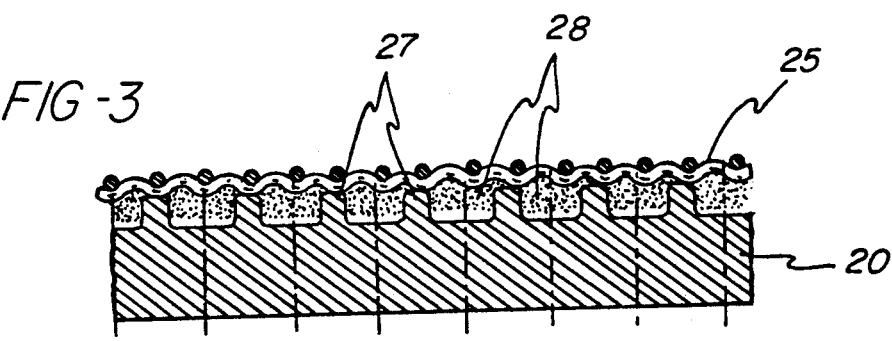
FIG. 3 is an enlarged fragmentary section on the line 3—3 in FIG. 2.

Dilution water is added as needed to provide the feed stock to each of the screening and cleaning stations with the proper consistency as is conventional in the industry, with the accepted stock from cleaner 13 having a consistency of approximately 1.0%. The screened stock from stations 10-13 is then supplied to the fractionation apparatus 15 which, as noted above, preferably comprises a washer-thickener of the construction disclosed in Seifert U.S. Pat. No. 4,722,793, as shown in FIGS. 2-3. This screened stock will usually contain, as solid constituents, paper fibers of a wide variety of lengths, ranging from less than 0.20 mm to 4 mm or more, ink particles which commonly range from less than 0.010 to 0.10 mm in diameter, and clay particles which are even smaller than the ink particles.

The apparatus 15 comprises first and second rolls 20 and 22 mounted on parallel axes within the loop of a continuous mesh belt 25 which is of a predetermined mesh such that in the use of the apparatus, only particles of less than a selected dimension, e.g. a maximum dimension of 0.20 mm, will pass freely therethrough. More specifically, in the practice of the invention, a belt of a mesh providing open spaces 0.175 mm square will retain substantially all paper making fibers greater than 0.20 mm in length, and which are classified as "long" fibers for the purposes of this description of the present invention, but will allow passage of fines and contaminant particles of the same maximum dimension.

The rolls 20 and 22 and the belt 25 are provided with a common drive 26, and as indicated by arrows in FIG. 2, the drive is such that the upper run of the belt 25 travels toward the roll 20 while its lower run travels towards the roll 22. In the preferred form of the apparatus shown in FIGS. 2 and 3, the first roll 20 is an imperforate roll having peripheral ribs 27 on its surface which support the belt 25 in radially spaced relation with the bottoms of the grooves 28 between adjacent ribs. Typical satisfactory dimension for these parts are a radial depth of 0.37 inch and an axial width of 0.75 inch for the grooves 28 and an axial width of 0.25 inch for the ribs 27.

The screened stock from cleaner 13 is supplied by way of a nozzle-type headbox 30 to the wedge shaped zone 31 defined by the upper surface of roll 20 and the portion of the upper run of the belt 25 approaching roll 20. The drive 26 is caused to drive the rolls and belt at a surface speed sufficiently high—e.g. 3,000 ft./min. with rolls which are 30 inches in diameter—to effect the development of enough centrifugal force to cause the liquid component of the feed stock to be expressed through the belt 25, carrying with it the non-fibrous constituents of the stock, such particularly as ink particles, clay and ash, along with fines. All of the working parts of this apparatus are enclosed in a hood 33, and the resulting suspension of fines and contaminant particles is collected in the trough 35 under the hood 33 and its outlet 36.

The longer fiber constituents of the feed stock are retained on the inner surface of the mesh belt 25 as a discontinuous layer 40 composed of strips of thickened pulp aligned with the grooves 28 in roll 20 and separated by bare strips aligned with the ribs 27. This thickened pulp fraction is composed primarily of the long fiber constituents of the feed stock from cleaner 13, but also including substantial quantities of fines which are trapped by the accumulating mat of long fibers. This fraction of the feed stock travels on the inner surface of the lower run of the belt to and around the second roll 22, where it is subjected to further expression of liquid as a result of centrifugal force aided by belt tension compression which tends to compress the strips of pulp into contact with each other.

When the resulting thickened pulp layer reaches the top of roll 22, it has a natural tendency to remain on the surface of the roll and separate from the belt 25, because this roll surface is smoother than the belt. Then this transferred pulp layer is removed from the surface of roll 22, preferably by means of a non-contacting doctor blade 42 in accordance with the disclosure of the co-owned Bliss et al U.S. Pat. No. 5,021,159. The pulp layer 40, which constitutes the first fraction of the feed stock, slides down the inclined surface of this blade 42 into a trough 44 having therein a conveyor screw 45 by which it is removed from inside the loop of the belt 25.

The operation of the washer-thickener 15 as just described results in fractionation of the screened feed stock into a first fraction of substantially increased solids content, e.g. a consistency as high as 15% solids, comprising primarily paper fibers of greater than the selected reference length and also substantial quantities of fines. In contrast, the second fraction comprises the great majority of the liquid carrier portion of the feed stock, together with the large majority of contaminant particles along with many short fibers of less than the selected reference length, and this second fraction is collected at the outlet 36.

The effectiveness of this fractionation is a direct result of the operating characteristics of the washer-thickener shown in FIGS. 2-3, which promote the optimum separation of the solid constituents of the feed stock on the basis of particle size. As a practical example of this point, if the feed stock has a consistency of approximately 1% and the long fiber first fraction has a consistency of 5% as it leaves roll 20 on belt 25, this means that 80% of the liquid carrier is expressed through belt 25 while the retained fraction travels 180° between the belt and roll 20.

At the high speed of 3,000 ft./min. with 30-inch diameter rolls 20 and 22 which is standard operating practice with this washer-thickener, this 5 to 1 dewatering occurs in the course of a single half-revolution of roll 20 or about 0.125 second. In addition, where with pressure screens such as have been previously suggested for this purpose, the stock is subjected to hydraulic pressure and shear forces during fractionation, in the use of the washer-thickener 15, the forces are limited to the discharge velocity from the nozzle type headbox 30, which drives much of the liquid carrier and small particles directly through the wire, and centrifugal force after the stock enters the grooves 28.

More specifically, with the grooved surface of the roll 20 of the dimensions noted above, the width of the discharge opening from headbox 30 is preferably held to less than the depth of the grooves 28, e.g. 0.34 inch if the grooves are 0.37 inch in depth. In addition, the supply flow rate of stock from the headbox 30 is controlled to be slightly less than the total capacity of the grooves 28, e.g. 3,000 gallons per minute where the capacity of the grooves is 3,007 gallons per minute.

The combination of these structural and operational conditions assures that the grooves 28 will never be full of suspension, and there will therefore never be any hydraulic or mechanical pressure thereon by reason of mechanical pressure in the groove. Rather, centrifugal force will urge the stock radially outwardly toward the inner surface of the mesh belt 25 so that the long fibers therein will be retained by the belt while the liquid component and the fines and other small particles will pass through the belt. While the long fibers which collect on the inner surface of belt 25 will have some tendency to trap shorter fibers, it has been found that because so much dewatering occurs during the initial introduction of the stock into the space between the belt 25 and roll 20, much of the desired fractionation occurs almost instantly, namely before there has been sufficient accumulation of fiber on the surface of the belt 25 to impede the passage of small particles and many of the fines therethrough with the liquid carrier of the suspension.

In other words, these operating conditions create a violent flushing action effective on the long fibers retained on the belt 25 which assures that the ink and other small particles will remain dispersed in the liquid within the grooves 28 so that they will be entrained with the liquid expressed through belt 25. Further, the final consistency of the retained fraction removed from roll 22 is notably higher than that of the feed stock, i.e. usually 8-12%, but it may be as high as 15%, depending upon the constituents of the pulped furnish and its resulting freeness. A final consistency of 10% means that one-half of the remaining liquid is removed as the long fiber fraction travels to and around the roll 22, and this departing liquid should carry with it most if not all remaining fine particles.

A substantial proportion of the retained solids comprise fines which are trapped in or on the layer of long fibers on the inner surface of belt 25 instead of being entrained with the white water expressed through the belt. This is an advantageous result because while froth flotation is effective in removing ink, clay and other fine particles from a suspension thereof with short fibers, there is a tendency for the rising froth bubbles in a flotation separator to attach themselves to and thereby to lift fibers to the top of the liquid level where they overflow with the other froth-carried particles and are lost.

Maximum salvage of fines is desired, because they impart improved smoothness to the paper made from the deinked stock. This is another advantage of the practice of the invention, because not only is there minimal out-flow of long fibers with the white water, but also there is substantial retention of fines, thereby facilitating the subsequent separation of the contaminant particles from the fines which are carried through the mesh belt by the white water, and thus providing for ultimate recovery of those fines for recombination with the long fiber fraction and the fines retained therein.

As a measure of the efficacy of the apparatus 15 for the purposes of the present invention, tests indicate that where fines constituted approximately 50% of the fiber content of the feed suspension to be fractionated, they constituted less than 37% of the accepted fibers but more than 90% of the fiber content of the white water collected from the trough outlet 36.

Considered from the more important aspect of the retention of long fibers by the belt 25, the same test results show that where long fibers constituted approximately 50% of the feed stock, they constituted more than 63% of the first fiber fraction retained by the belt 25 and less than 9% of the fibers in the second fraction or white water to be subjected to froth flotation separation. Even more significant is that on the basis of the same test information, fibers greater than 0.40 mm in length represented approximately 34% of the fibrous constituents of the feed stock, but they represented approximately 43% of the fiber retained on the belt 25 and only 3% of the fibers in the white water.

The suspension fractions produced by the apparatus 15 are treated separately before being recombined, according to the preference of the pulp mill where the invention is practiced. For example, as illustrated in FIG. 2, the white water fraction is preferably subjected to froth flotation in one or more cells 50 of commercially available structure and mode of operation to separate the ink and clay particles from the fibers. As previously noted, this treatment is particularly effective because this fraction contains so few long fibers and only a portion of the fines. In addition, the white water is of such low consistency as it comes from the apparatus 15, e.g. only about 0.25%, that it needs no dilution before the flotation treatment. The resulting suspension of cleaned fines is passed through a bleaching station 52 where a bleaching agent less expensive than hydrogen peroxide may be used, e.g. $Na_2S_2O_4$.

The long fiber fraction removed from the apparatus 15 is preferably first further reduced in consistency, as by passage through a conventional press 54 which will reduce its solids content to 25 to 30%. A screw press is particularly suitable for this purpose because its inlet can be directly connected with the outlet end of the screw conveyor 44-45 in the fractionator 15, and the liquid removed by press 54 can be recirculated to dilute the stock ahead of one or more of the preceding stations 11-15. The resulting further thickened fiber fraction may then be bleached at 55, preferably by treatment with hydrogen peroxide in a mixer-refiner of the structure and mode of operation described in Cumpston U.S. Pat. No. Re. 29,053. The two separately bleached fractions may then be combined, as indicated at 60, and transported to whatever subsequent station are desired.

While the methods herein described, and the forms of apparatus for carrying these methods into effect, constitute preferred embodiments of this invention, it is to be understood that the invention is not limited to these precise methods and forms of apparatus, and that change may be made in either without departing from the scope of the invention, which is defined in the appended claims.

What is claimed is:

1. A method of preparing deinked paper making stock from waste paper products composed of paper fibers of different lengths and containing light and heavy non-fibrous contaminant particles of sizes both larger and smaller than paper making fibers, comprising the steps of:
    (a) pulping such waste paper products in water to produce a suspension of fibrous and non-fibrous materials including long and short fibers and light and heavy contaminant particles,
    (b) screening said diluted suspension to remove the larger of said contaminant particles therefrom while retaining therein the fibrous constituents thereof and said smaller contaminant particles,
    (c) filtering the resulting screened suspension through a continuously moving mesh belt of a predetermined mesh size which will retain substantially all of said fibers of greater than a predetermined length as a first suspension while providing for passage therethrough of said smaller contaminant particles and short fibers of less than said predetermined length with the majority of the liquid component of said screened suspension as a second suspension fraction, (d) said filtering step being characterized by including the step of directing said suspension into a wedge zone defined by an exposed surface of a roll rotatably mounted within a loop of an endless mesh belt and a portion of said belt approaching said roll to cause said suspension to flow between said roll surface and said belt, said roll having axially spaced peripheral ribs on the outer surface thereof with grooves between adjacent said ribs wherein said suspension is received, (e) controlling the flow rate of said suspension directing step to be less than the total capacity of said grooves in said roll surface, (f) said filtering step further including driving said roll and said wire at a predetermined surface speed sufficiently high to effect the development of centrifugal force causing the liquid component of the portion of said suspension between said belt and said roll to be expressed through said belt and to carry therewith said smaller contaminant particles and short fibers while said long fibers in said suspension are retained on the inner surface of said belt as a mat constituting said first suspension fraction, (g) training said belt around a second roll within the loop of said belt to which said belt travels from said grooved roll, (h) retaining said first suspension fraction on said belt while traveling thereon to and around said second roll and thereby effecting the expression of further liquid from said first fraction through said belt, said second roll having a smoother surface than said belt whereby said first fraction transfers thereto from said belt, (i) removing said first fraction from said second roll and submitting said removed fraction to a bleaching treatment, (j) subjecting said second suspension fraction to a flotation treatment to remove therefrom the non-fibrous constituents thereof while retaining therein the fibrous constituents, (k) subjecting said second suspension fibrous fraction to a bleaching treatment, and (l) then recombining said fractions.

2. The method defined in claim 1 wherein said filtering step is extended until said first suspension fraction has a solids content of at least 8%.

3. A system for preparing deinked paper making stock from waste paper products composed of paper fibers of different lengths and containing light and heavy contaminant particles of sizes both larger and smaller than paper making fibers, comprising:

(a) means for pulping such waste paper products in water to produce a suspension of fibrous and non-fibrous materials including long and short fibers and light and heavy contaminant particles, (b) means connected to receive and screen said suspension to remove the larger of said contaminant particles therefrom while retaining therein the fibrous constituents thereof and said smaller contaminant particles, (c) means connected to receive and fractionate the resulting screened suspension into a first suspension fraction containing primarily those of said fibers of greater than a predetermined length and a second suspension fraction containing said smaller contaminant particles and fibers of less than said predetermined length with the majority of the liquid component of said screened suspension, (d) said fractionating means including an endless mesh belt of a predetermined mesh size which will retain substantially all of said fibers of greater than said predetermined length while passing therethrough said smaller contaminant particles and short fibers, (e) said fractionating means including first and second rolls rotatably mounted on substantially parallel axes in spaced relation within said endless mesh belt and with said belt trained around said rolls in wrapping relation with a substantial portion of the surface of each thereof, (f) said fractionating means also including a headbox connected to receive said screened suspension and having a discharge opening positioned to discharge said suspension into the wedge zone defined by said first roll and the portion of said belt approaching said first roll, (g) said first roll having axially spaced ribs on the outer surface thereof with grooves between adjacent said ribs whereby said screened suspension is initially received and confined within said grooves by the portion of said belt wrapping said grooved roll, (h) the width of said discharge opening of said headbox being less than the depth of said grooves, (i) said fractionating means also including means for driving said rolls and said belt at a speed sufficiently high to effect the development of centrifugal force causing liquid in said confined suspension to be expressed outwardly through said belt together with fibers and other particles smaller than said predetermined length as said second suspension fraction while retaining longer fibers as a layer on the inner surface of said belt which constitutes said first suspension fraction and is carried by said belt to and around said second roll, (j) means for collecting said first suspension fraction after said fraction has passed between said belt and the surface of said second roll wrapped by said belt, (k) means connected to receive said first suspension fraction from said collecting means and to subject said collected fraction to a bleaching treatment, (l) means connected to receive and subject said second suspension fraction to a flotation treatment to remove therefrom the non-fibrous constituents thereof while retaining short fibers therein, and (m) means connected to receive and recombine said fractions.

4. The system defined in claim 3 further comprising means for maintaining said mesh belt under sufficient tension to apply dewatering pressure to said first fraction against the wrapped surface of said second roll.

* * * * *